United States Patent
Katori et al.

(10) Patent No.: US 11,489,194 B2
(45) Date of Patent: Nov. 1, 2022

(54) METHOD FOR PRODUCING LGPS-BASED SOLID ELECTROLYTE

(71) Applicant: MITSUBISHI GAS CHEMICAL COMPANY, INC., Tokyo (JP)

(72) Inventors: Aki Katori, Niigata (JP); Tomohiro Ito, Niigata (JP); Masahiro Shimada, Tokyo (JP); Kotaro Kawakami, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 331 days.

(21) Appl. No.: 16/641,164

(22) PCT Filed: Aug. 16, 2018

(86) PCT No.: PCT/JP2018/030397
§ 371 (c)(1),
(2) Date: Feb. 21, 2020

(87) PCT Pub. No.: WO2019/044517
PCT Pub. Date: Mar. 7, 2019

(65) Prior Publication Data
US 2020/0194825 A1    Jun. 18, 2020

(30) Foreign Application Priority Data
Sep. 1, 2017   (JP) .............................. JP2017-168770

(51) Int. Cl.
*H01M 10/0562* (2010.01)
*C01G 19/00* (2006.01)
*H01M 10/0525* (2010.01)

(52) U.S. Cl.
CPC ...... *H01M 10/0562* (2013.01); *C01G 19/006* (2013.01); *H01M 10/0525* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2013/0040208 A1* | 2/2013 | Kanno | H01M 10/0562 429/321 |
| 2015/0093652 A1* | 4/2015 | Aihara | H01M 10/0562 423/303 |

(Continued)

FOREIGN PATENT DOCUMENTS

| | | |
|---|---|---|
| CN | 103500853 A | 1/2014 |
| CN | 105098228 A | 11/2015 |

(Continued)

OTHER PUBLICATIONS

Office Action issued in Russian Patent Application No. 2020111239 dated Nov. 15, 2021, along with English translation thereof.

(Continued)

*Primary Examiner* — Daniel S Gatewood
(74) *Attorney, Agent, or Firm* — Greenblum & Bernstein, P.L.C.

(57) ABSTRACT

A method for producing an LGPS-type solid electrolyte can be provided, the method includes preparing a homogeneous solution by mixing and reacting $Li_2S$ and $P_2S_5$ in an organic solution such that the molar ratio of $Li_2S/P_2S_5$ is 1.0-1.85; forming a precipitate by adding, to the homogeneous solution, at least one $MS_2$ (M is selected from the group consisting of Ge, Si, and Sn) and $Li_2S$ and then mixing; obtaining a precursor by removing the organic solution from the precipitate; and obtaining the LGPS-type solid electrolyte by heating the precursor at 200-700° C.

7 Claims, 3 Drawing Sheets

(52) U.S. Cl.
CPC ...... *C01P 2002/72* (2013.01); *C01P 2002/82* (2013.01); *C01P 2006/40* (2013.01)

(56) References Cited

U.S. PATENT DOCUMENTS

| | | |
|---|---|---|
| 2016/0172706 A1 | 6/2016 | Xiao et al. |
| 2018/0205116 A1 | 7/2018 | Ryoji et al. |

FOREIGN PATENT DOCUMENTS

| | | | |
|---|---|---|---|
| CN | 105703008 A | | 6/2016 |
| JP | 2002-109955 A | | 4/2002 |
| JP | 2014-220051 | | 11/2014 |
| JP | 2014220051 A | * | 11/2014 |
| JP | 2015-232965 | | 12/2015 |
| RU | 2066901 C1 | | 9/1996 |
| RU | 1 075 880 A1 | | 11/1999 |
| WO | 2011/118801 | | 9/2011 |
| WO | 2017/007030 A1 | | 1/2017 |

OTHER PUBLICATIONS

Supplementary European Search Report dated Jun. 12, 2020 in European Patent Application No. 18850262.9.
Phuc Nguyen Huu Huy et al,, Solid State Ionics, vol. 288, Dec. 10, 2015 (Dec. 10, 2015), pp. 240-243.
Kato, Yuki et al., "High-power all-solid-state batteries using sulfide superionic conductors", Nature Energy 1, Article No. 16030, Mar. 21, 2016, pp. 1-7.
Liu, Zengcai et al., "Anomalous High Ionic Conductivity of Nanoporous B-Li3PS4", Journal of the American Chemical Society, vol. 135, No. 3, Jan. 10, 2013, pp. 975-978.
Official Communication dated Oct. 2, 2018 in International Patent Application No. PCT/JP2018/030397.
Office Action issued in the corresponding Taiwanese Patent Application No. 107129714 dated Jan. 17, 2022.

* cited by examiner

[Figure 1]
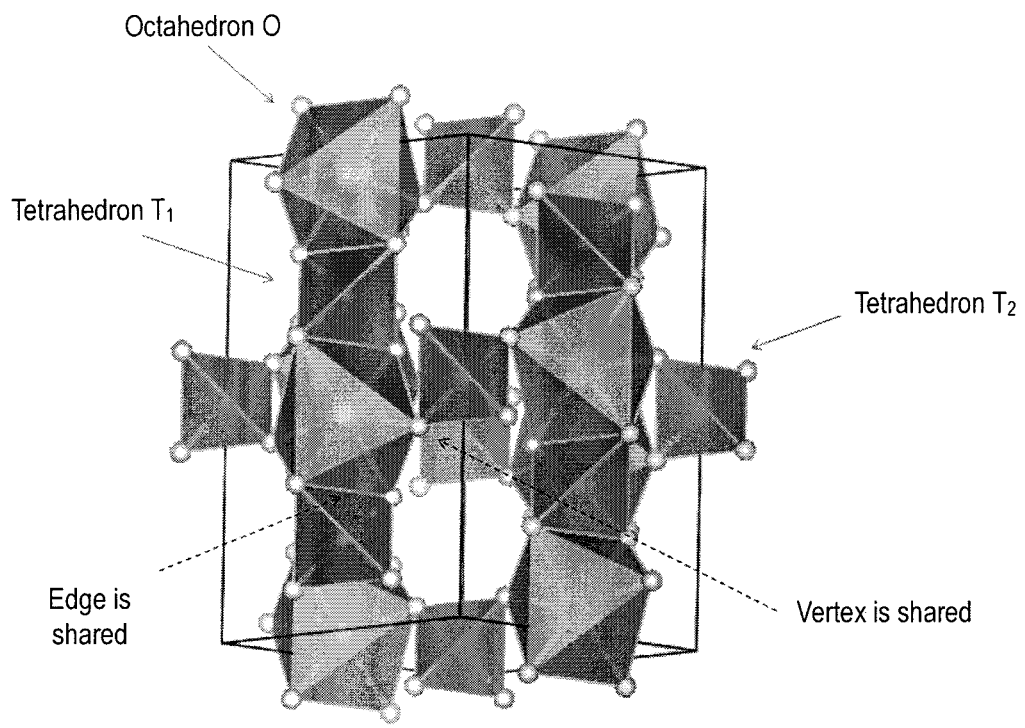
[Figure 2]
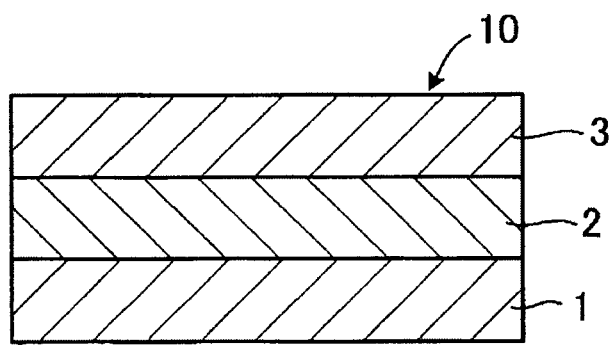

[Figure 3]
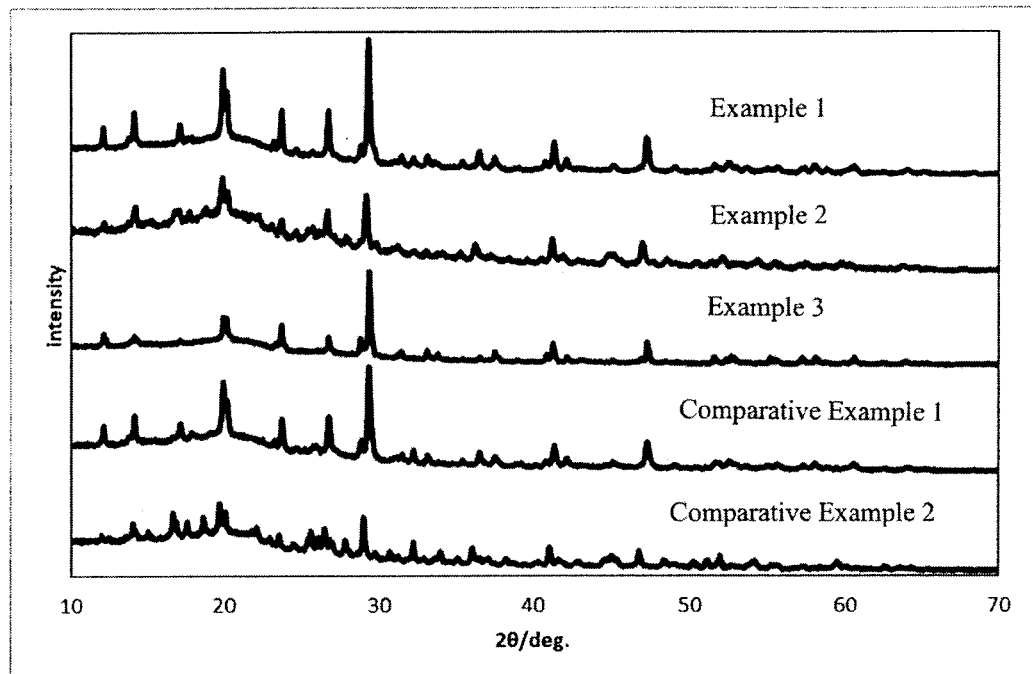
[Figure 4]
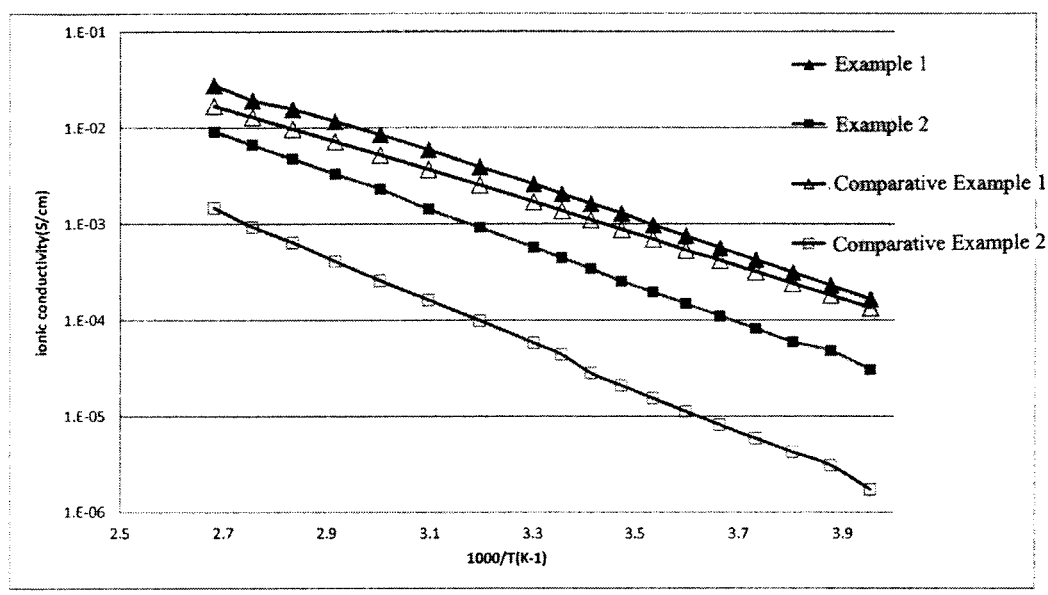

[Figure 5]
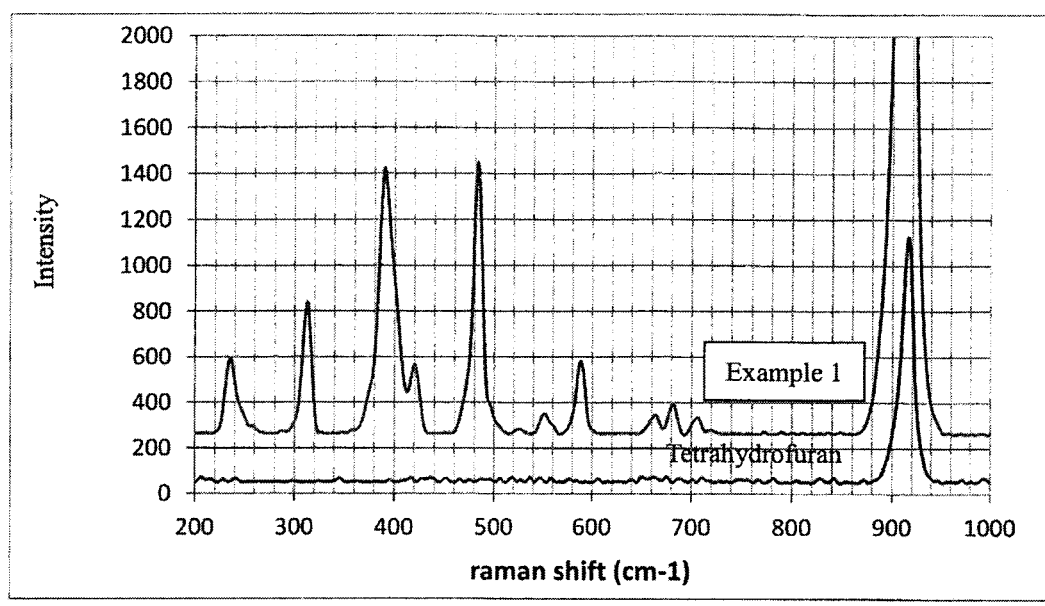

METHOD FOR PRODUCING LGPS-BASED SOLID ELECTROLYTE

TECHNICAL FIELD

The present invention relates to a method for producing an LGPS-type solid electrolyte. The LGPS-type solid electrolyte refers to a solid electrolyte having a specific crystal structure including Li, P and S, and examples thereof include a solid electrolyte including Li, M (M is at least one element selected from the group consisting of Ge, Si and Sn), P and S.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide or the like as a solid electrolyte in an all-solid-state lithium ion secondary battery has been examined.

Among these solid electrolytes, the sulfide has characteristics that it has high ion conductivity and is relatively soft, and that it is easy to form the interface between solids. The sulfide is stable with respect to active materials and has been developed as a practical solid electrolyte.

Among sulfide solid electrolytes, there is an LGPS-type solid electrolyte having a specific crystal structure (Non-Patent Document 1 and Patent Document 1). Among sulfide solid electrolytes, LGPS has significantly high ion conductivity and can stably act at from a low temperature of −30° C. to a high temperature of 100° C., and therefore practical use thereof is highly expected.

However, in conventional methods for producing an LGPS-type solid electrolyte, the amorphous step including a complex treatment is required, and $P_2S_5$ which has high volatility and decomposability is used as a raw material, and for this reason, there are problems that synthesis can be carried out only at a small scale, and that an LGPS-type solid electrolyte exhibiting stable performance cannot be easily obtained.

PRIOR ART DOCUMENTS

Patent Documents

Patent Document 1: International Publication WO2011/118801 pamphlet

Non-Patent Documents

Non-Patent Document 1: Nature Energy 1, Article number: 16030 (2016)

SUMMARY OF THE INVENTION

Problems to be Solved by the Invention

Under the above-described circumstances, it has been desired to provide a method for producing an LGPS-type solid electrolyte which has excellent productivity, suppresses the generation of by-products and exhibits stable performance.

Means for Solving the Problems

The present inventors diligently made researches in consideration of the above-described problem, and obtained an unexpected finding that by mixing and reacting $Li_2S$ and $P_2S_5$ in an organic solvent to obtain a homogeneous solution, suspending at least one $MS_2$ (M is selected from the group consisting of Ge, Si and Sn) in the homogeneous solution, subsequently adding $Li_2S$ thereto to be mixed therewith to obtain a precipitate, and using it as a precursor, a stable LGPS-type solid electrolyte with little impurities can be produced without use of mechanical milling.

Specifically, the present invention is as described below.

<1> A method for producing an LGPS-type solid electrolyte, which comprises:

a solution-making step in which a homogeneous solution is prepared by mixing and reacting $Li_2S$ and $P_2S_5$ in an organic solvent, wherein the molar ratio of $Li_2S/P_2S_5$ is 1.0 to 1.85;

a precipitation step in which at least one $MS_2$ (M is selected from the group consisting of Ge, Si and Sn) and $Li_2S$ are added to and mixed with the homogeneous solution to form a precipitate;

a drying step in which the organic solvent is removed from the precipitate to obtain a precursor; and a heat treatment step in which the precursor is heated at 200 to 700° C. to obtain the LGPS-type solid electrolyte.

<2> The method according to item <1>, wherein the organic solvent is at least one selected from the group consisting of tetrahydrofuran, acetonitrile, ethyl acetate and methyl acetate.

<3> The method according to item <1> or <2>, wherein the temperature in the drying step is 60 to 280° C.

<4> The method according to any one of items <1> to <3>, wherein the LGPS-type solid electrolyte has peaks at at least 2θ=20.18°±0.50°, 20.44°±0.50°, 26.96°±0.50° and 29.58°±0.50° in X-ray diffraction (CuKα: λ=1.5405 Å).

<5> The method according to item <4>, wherein when the diffraction intensity of the peak at 2θ=29.58°±0.50° is referred to as $I_A$ and the diffraction intensity of the peak at 2θ=27.33°±0.50° is referred to as $I_B$, $I_B/I_A$ is less than 0.50.

<6> The method according to any one of items <1> to <5>, wherein the LGPS-type solid electrolyte has an octahedron O composed of an Li element and an S element, a tetrahedron $T_1$ composed of at least one element selected from the group consisting of P, Ge, Si and Sn and an S element, and a tetrahedron $T_2$ composed of a P element and an S element, and mainly includes a crystal structure in which the tetrahedron $T_1$ and the octahedron O share an edge and the tetrahedron $T_2$ and the octahedron O share a vertex.

<7> The method according to any one of items <1> to <6>, wherein the heat treatment step is carried out under inert gas atmosphere.

<8> A homogenous solution, which comprises a compound composed of elements of Li, S and P as a solute and tetrahydrofuran as a solvent, and which has peaks at at least $313\pm10$ cm$^{-1}$, $391\pm10$ cm$^{-1}$, $483\pm10$ cm$^{-1}$ and $589\pm10$ cm$^{-1}$ in a Raman spectroscopy.

<9> A homogenous solution, which comprises a compound composed of elements of Li, S and P as a solute and acetonitrile as a solvent, and which has peaks at at least $313\pm10$ cm$^{-1}$, $391\pm10$ cm$^{-1}$, $483\pm10$ cm$^{-1}$ and $589\pm10$ cm$^{-1}$ in a Raman spectroscopy.

<10> A homogenous solution, which comprises a compound composed of elements of Li, S and P as a solute and an acetic acid ester as a solvent, and which has peaks at at least $313\pm10$ cm$^{-1}$, $391\pm10$ cm$^{-1}$, $483\pm10$ cm$^{-1}$ and $589\pm10$ cm$^{-1}$ in a Raman spectroscopy.

<11> The homogenous solution according to item <10>, wherein the acetic acid ester is ethyl acetate or methyl acetate.

Advantageous Effect of the Invention

According to the present invention, it is possible to provide a method for producing an LGPS-type solid electrolyte. In addition, according to the present invention, it is possible to provide a formed body obtained by heating and forming the LGPS-type solid electrolyte and an all-solid-state battery including the LGPS-type solid electrolyte. Moreover, this production method can be applied to mass production.

BRIEF DESCRIPTION OF THE DRAWINGS

FIG. 1 is a schematic view showing a crystal structure of an LGPS-type solid electrolyte according to one embodiment of the present invention.

FIG. 2 is a schematic cross sectional view of an all-solid-state battery according to one embodiment of the present invention.

FIG. 3 is a graph showing the results of the X-ray diffraction measurement of the ion conductors obtained in Examples 1-2 and Comparative Examples 1-2.

FIG. 4 is a graph showing the results of the ion conductivity measurement of the ion conductors obtained in Examples 1-2 and Comparative Examples 1-2.

FIG. 5 is a graph showing the results of Raman spectroscopy of the homogeneous solution obtained in <Solution-making step> in Example 1.

EMBODIMENTS FOR CARRYING OUT THE INVENTION

Hereinafter, the method for producing the LGPS-type solid electrolyte of the present invention will be specifically described. Note that materials, constitutions, etc. described below do not limit the present invention and can be modified variously within the range of the gist of the present invention.

<Method for Producing LGPS-Type Solid Electrolyte>

In one embodiment of the present invention, the method for producing an LGPS-type solid electrolyte has:

a solution-making step in which a homogeneous solution is produced by mixing and reacting $Li_2S$ and $P_2S_5$ in an organic solvent, wherein the molar ratio of $Li_2S/P_2S_5$ is 1.0 to 1.85;

a precipitation step in which at least one $MS_2$ (M is selected from the group consisting of Ge, Si and Sn) is added to and suspended in the homogeneous solution and additional $Li_2S$ is further added thereto and mixed therewith to generate a precipitate;

a drying step in which the organic solvent is removed from the precipitate to obtain a precursor; and a heat treatment step in which the precursor is heated at 200 to 700° C.

The LGPS-type solid electrolyte preferably has peaks at at least $2\theta=20.18°\pm0.50°$, $20.44°\pm0.50°$, $26.96°\pm0.50°$ and $29.58°\pm0.50°$ in X-ray diffraction (CuKα: $\lambda=1.5405$ Å). More preferably, it has peaks at $2\theta=17.38°\pm0.50°$, $20.18°\pm0.50°$, $20.44°\pm0.50°$, $23.56\pm0.50°$, $26.96°\pm0.50°$, $29.07\pm0.50°$, $29.58°\pm0.50°$ and $31.71\pm0.50°$.

Further, regarding the LGPS-type solid electrolyte, when the diffraction intensity of the peak at $2\theta=29.58°\pm0.50°$ is referred to as $I_A$ and the diffraction intensity of the peak at $2\theta=27.33°\pm0.50°$ is referred to as $I_B$, $I_B/I_A$ is preferably less than 0.50. More preferably, $I_B/I_A$ is less than 0.40. This is because the peak of LGPS crystal corresponds to $I_A$ and a crystal phase having low ion conductivity corresponds to $I_B$.

Moreover, it is preferred that the LGPS-type solid electrolyte has an octahedron O composed of an Li element and an S element, a tetrahedron $T_1$ composed of at least one element selected from the group consisting of P, Ge, Si and Sn and an S element, and a tetrahedron $T_2$ composed of a P element and an S element, and mainly includes a crystal structure in which the tetrahedron $T_1$ and the octahedron O share an edge and the tetrahedron $T_2$ and the octahedron O share a vertex as shown in FIG. 1.

As a conventional method for producing an LGPS-type solid electrolyte, after synthesizing an ion conductor using $Li_2S$, $P_2S_5$ and MXS) (e.g., $GeS_2$) as raw materials, a mechanical milling method using a vibrating mill or planetary ball mill (Patent Document 1) or a melt quenching method described in International Publication WO2014/196442 pamphlet is carried out to obtain an amorphous precursor. However, in the case of the mechanical milling method, it is difficult to carry out increase in scale to an industrial scale, and carrying out the melt quenching method without being exposed to atmosphere is significantly limited in view of atmosphere control. Note that the LGPS-type solid electrolyte and raw materials thereof have a property that these react with moisture or oxygen in the atmosphere to change in quality. In this regard, according to the production method of the present invention, the amorphization step using mechanical milling is not required. The LGPS-type solid electrolyte can be produced by obtaining a precursor from a solution and slurry state, wherein it is easy to carry out increase in scale and atmosphere control.

<Solution-Making Step>

In the production method of the present invention, $Li_2S$ and $P_2S_5$ are mixed and reacted in an organic solvent at a molar ratio of $Li_2S/P_2S_5=1.0$ to 1.85 to produce a homogeneous solution. In the present invention, the homogeneous solution means a solution in which there is no undissolved precipitate. In this regard, the above-described molar ratio is preferably $Li_2S/P_2S_5=1.1$ to 1.5, and more preferably $Li_2S/P_2S_5=1.2$ to 1.4. When the molar ratio of $Li_2S/P_2S_5$ is 1.0 to 1.85, a solution can be made by using $Li_2S$ and $P_2S_5$ at room temperature. When the molar ratio is not within the above-described range, precipitation may be caused. Note that when an undissolved precipitate is separated from a solution by means of filtration or the like, the composition in the solution becomes the same as that obtained in the solution-making step carried out with a molar ratio within the above-described range.

As $Li_2S$, a synthesized product or commercially-available product can be used. The lower the content of moisture is, the better it is because mixing of moisture deteriorates the other raw materials and the precursor. The content is more preferably 300 ppm or less, and particularly preferably 50 ppm or less. The smaller the particle diameter of $Li_2S$ is, the better it is because a higher reaction rate is obtained. The particle diameter is preferably 10 nm to 100 μm, more preferably 100 nm to 30 μm, and even more preferably 300 nm to 10 μm. Note that the particle diameter can be measured by means of SEM, a particle size distribution measurement apparatus utilizing laser scattering, or the like.

As $P_2S_5$, a synthesized product or commercially-available product can be used. The higher the purity of $P_2S_5$ is, the better it is because the amount of impurities mixed into the solid electrolyte becomes smaller. The smaller the particle diameter of $P_2S_5$ is, the better it is because a higher reaction rate is obtained. The particle diameter is preferably 10 nm to 100 μM, more preferably 100 nm to 30 μm, and even more preferably 300 nm to 10 μm. The lower the content of moisture is, the better it is because mixing of moisture deteriorates the other raw materials and the precursor. The content is more preferably 300 ppm or less, and particularly preferably 50 ppm or less.

The organic solvent is not particularly limited as long as it does not react with $Li_2S$ or $P_2S_5$. Examples thereof include an ether-based solvent, an ester-based solvent, a hydrocarbon-based solvent and a nitrile-based solvent. Specific examples thereof include tetrahydrofuran, cyclopentyl methyl ether, diisopropyl ether, diethyl ether, dimethyl ether, dioxane, methyl acetate, ethyl acetate, butyl acetate and acetonitrile. Particularly preferred is tetrahydrofuran. For preventing deterioration of the raw material composition, it is preferred to remove oxygen and water in the organic solvent in advance. In particular, regarding the water content, it is preferably 100 ppm or less, and more preferably 50 ppm or less.

The total concentration of $Li_2S$ and $P_2S_5$ in the organic solvent is preferably 1 to 40% by weight, more preferably 5 to 30% by weight, and particularly preferably 10 to 20% by weight. When the total concentration of $Li_2S$ and $P_2S_5$ in the organic solvent is higher than 40% by weight, the viscosity of a slurry is increased and it may become difficult to perform mixing. Meanwhile, when the total concentration of $Li_2S$ and $P_2S_5$ in the organic solvent is lower than 1% by weight, a large amount of the organic solvent must be used and a load of solvent recovery is increased. In addition, it causes excessive increase in the size of a reactor.

Regarding the reaction mechanism of the solution-making step in the present invention, $Li_2S$ gradually reacts with $P_2S_5$ suspended in the organic solvent, resulting in a state in which a solution can be made. However, it is preferred that firstly $Li_2S$ is added to and suspended in the organic solvent, followed by gradually adding $P_2S_5$ thereto. This is because, when $Li_2S$ is added in a state where $P_2S_5$ is in an excess amount, a condensed polymer may be generated. In the present invention, it is preferred to carry out mixing in a manner such that the molar ratio of $P_2S_5$ to $Li_2S$ ($P_2S_5/Li_2S$) in a composition (slurry) containing the organic solvent, $P_2S_5$ and $Li_2S$ is adjusted to be constantly lower than 1.

At the time of mixing in the solution-making step, a substrate is dispersed to provide a slurry state, but it is reacted to become homogeneous finally. There is no need to carry out special stirring operation for crushing particles, and it is sufficient when stirring power that can enable suspension and dispersion of the slurry is provided.

Regarding the reaction temperature in the solution-making step, the reaction slowly proceeds even at room temperature, but heating can be performed for increasing the reaction rate. When heating is performed, it is sufficient when it is performed at a temperature that is the boiling point of the organic solvent or lower. The temperature varies depending on the organic solvent to be used, but is usually lower than 120° C. Heating can also be performed under the pressurized state using an autoclave or the like. However, when mixing is carried out at a high temperature (120° C. or higher), there is concern that a side reaction may proceed.

The reaction time in the solution-making step varies depending on the type of the organic solvent and the particle diameter and concentration of raw materials, but for example, by performing the reaction for 0.1 to 24 hours, the reaction is completed and a solution can be made.

In the mixed solution made, a slight amount of a precipitate may be generated depending on the composition ratio for adding and the condition of mixing of raw material impurities. In this case, it is desirable to remove the precipitate by means of filtration or centrifugation.

<Precipitation Step>

At least one $MS_2$ (M is selected from the group consisting of Ge, Si and Sn) is added to and mixed with the homogeneous solution obtained in the solution-making step to be suspended therein. Next, additional $Li_2S$ is added thereto and mixed therewith to generate a precipitate.

As a mixing method, mixing using an ordinary stirring blade is sufficient. For the purpose of crushing particles of $MS_2$ and $Li_2S$ added, it is preferred to perform disintegration by means of stirring. Moreover, a homogenizer or an ultrasonic disperser may also be used.

Regarding $MS_2$, M is an element selected from the group consisting of Ge. Si and Sn, and usually, the valence of the element is preferably tetravalent. Specifically, $GeS_2$, $SiS_2$ and $SnS_2$ can be employed, and a commercially-available product can be used. $MS_2$s may be used solely, or two or more of them may be used in combination. The smaller the particle diameter of $MS_2$ is, the better it is because better compatibility is obtained. The particle diameter is preferably 10 nm to 100 μm, more preferably 100 nm to 30 μm, and even more preferably 300 nm to 10 μm. The particle diameter can be measured by means of SEM, a particle size distribution measurement apparatus utilizing laser scattering, or the like. Note that there is no problem even when a part of the above-described raw materials to be used are amorphous. The lower the content of moisture is, the better it is because mixing of moisture deteriorates the other raw materials and the precursor. The content is more preferably 300 ppm or less, and particularly preferably 50 ppm or less.

When additional $Li_2S$ is added to a suspension obtained by suspending $MS_2$ in the homogeneous solution, a precipitate gradually increases. The precipitate may be a solvate. For example, it is considered that when tetrahydrofuran (THF) is used as the organic solvent, $Li_3PS_4 \cdot 3THF$ crystal is obtained. $Li_2S$ to be added may be the same as that used in the solution-making step. The adding amount is basically adjusted such that the molar ratio of all the raw materials added to the system becomes $Li_2S:P_2S_5:MS_2=5:1:1$. Though the elemental composition ratio varies depending on the element used and there is a composition containing halogen, there is no problem as long as an LGPS crystal can be made by the composition. For example, LiCl may be added before additional $Li_2S$ is added. The adding amount is basically adjusted such that the molar ratio of all the raw materials added to the system becomes $Li_2S:P_2S_5:MS_2:LiCl=6.42:1:2.42:0.42$, but the raw material ratio can be suitably changed.

As the LGPS-type solid electrolyte, for example, $Li_{10}GeP_2S_{12}$, $Li_{10}SnP_2S_{12}$, $Li_{9.54}Si_{1.74}P_{1.44}S_{11.7}Cl_{0.3}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{10}GeP_2S_{11.7}O_{0.3}$, $Li_{9.6}P_3S_{12}$, $Li_9P_3S_9O_3$, $Li_{10.35}Ge_{1.35}P_{1.65}S_{12}$, $Li_{10.35}Si_{1.35}P_{1.65}S_{12}$, $Li_{9.81}Sn_{0.81}P_{2.19}S_{12}$, $Li_{9.42}Si_{1.02}P_{2.1}S_{9.96}O_{2.04}$, etc. are known.

The precipitate is generated when the reaction proceeds to produce $Li_3PS_4$. The reaction mechanism is not known, but it is considered that the material is dissolved in the solution in the state of —(P—S—P—S)n-. It is considered that $Li_2S$ added thereto is dispersed in a slurry state and cleaves P—S, thereby producing $Li_3PS_4$.

The mixing time for suspending $MS_2$ in the homogeneous solution is preferably 0.1 to 6 hours. By carrying out mixing to this extent, a state in which $MS_2$ is sufficiently suspended is obtained. The mixing time after $Li_2S$ is further added may be 0.1 to 24 hours, and it is more preferably 4 to 12 hours. Note that since $Li_2S$ further added reacts with $Li_2S$—$P_2S_5$ in a solution state, when the reaction time is short, desired $Li_3PS_4$ is produced insufficiently and unreacted $Li_2S$ is mixed in the precipitate.

The temperature at the time of mixing may be room temperature. Heating may be performed, but when the temperature is too high, there is concern that a side reaction may proceed. When heating is performed, it is sufficient when it is performed at a temperature that is the boiling point of the organic solvent or lower. The temperature varies depending on the organic solvent to be used, but is usually lower than 120° C.

Mixing in the precipitation step is preferably performed under inert gas atmosphere. Examples of the inert gas include nitrogen, helium and argon, and particularly preferred is argon. By also removing oxygen and moisture in the inert gas, deterioration of the raw material composition can be suppressed. The concentration of each of oxygen and moisture in the inert gas is preferably 1000 ppm or less, more preferably 100 ppm or less, and particularly preferably 10 ppm or less.

The obtained precipitate is preferably separated from the solution by means of filtration or centrifugation. In the production method of the present invention, the amount of by-products generated is very small, but by separating the precipitate from the solution, the purification effect is obtained. By washing the separated precipitate with a solvent, the purification degree can be further increased. Since the amount of by-products produced is very small, it is not required to use a large amount of a washing solvent. For example, it is sufficient to use 50 parts by weight to 600 parts by weight of the solvent relative to 100 parts by weight of the precipitate. As the washing solvent, the same organic solvent as that used in the solution-making step is preferably used, but the washing solvent is not particularly limited as long as it is an organic solvent which does not react with $Li_3PS_4$.

<Drying Step>

The obtained precipitate is dried to remove the organic solvent, thereby obtaining a precursor. Drying can be carried out by means of heated-air drying or vacuum drying under inert gas atmosphere.

The drying temperature is preferably 60 to 280° C., and more preferably 100 to 250° C. The optimum temperature range slightly varies depending on the type of the organic solvent, but the temperature range is important. When the drying temperature is set to be too high in a state where the organic solvent exists, the quality of the precursor changes in almost all cases. Further, when the drying temperature is too low, the amount of the residual solvent is larger, and when the next heat treatment step is directly carried out, the organic solvent is carbonized and an LGPS-type solid electrolyte obtained has high electron conductivity. It may be preferred that the solid electrolyte has electron conductivity depending on the method for using it, but the solid electrolyte to be used for the portion 2 in FIG. 2 is required to have sufficiently low electron conductivity. In the case of using the solid electrolyte for such applications, the amount of the residual solvent must be decreased as much as possible.

The drying time slightly varies depending on the type of the organic solvent and the drying temperature, but the organic solvent can be sufficiently removed by drying for 1 to 24 hours. Note that by removing the organic solvent under reduced pressure as in the case of vacuum drying, and by flowing an inert gas such as nitrogen and argon in which the moisture content is sufficiently low, the temperature at the time of removing the organic solvent can be lowered and the required time can be shortened.

Note that the heat treatment step described below and the drying step can be carried out simultaneously.

<Heat Treatment Step>

In the production method of the present invention, the precursor obtained in the drying step is heat treated, thereby obtaining the LGPS-type solid electrolyte. The heating temperature varies depending on the type, and in the case of containing Ge, Si or Sn, the heating temperature is usually 200 to 700° C., more preferably 350 to 650° C., and particularly preferably 450 to 600° C. When the temperature is lower than the above-described range, desired crystals are not easily generated, and when the temperature is higher than the above-described range, crystals other than those desired are generated.

The heating time slightly varies depending on the heating temperature, but usually, crystallization is sufficiently performed when the heating time is 0.1 to 24 hours. It is not preferred that heating is carried out at a high temperature for a long period of time which exceeds the above-described range because there is concern for change in quality of the LGPS-type solid electrolyte.

Heating can be performed under vacuum or inert gas atmosphere, but preferably performed under inert gas atmosphere. As the inert gas, nitrogen, helium, argon or the like can be used, and among them, argon is preferred. The contents of oxygen and moisture are preferably low, and conditions thereof are the same as those at the time of mixing in the precipitation step.

The LGPS-type solid electrolyte of the present invention obtained in the above-described manner can be formed into a desired formed body by various means and can be used for various applications including an all-solid-state battery described below. The forming method is not particularly limited. For example, a method similar to the method for forming respective layers constituting the all-solid-state battery described in <All-solid-state battery> below can be used.

<All-Solid-State Battery>

The LGPS-type solid electrolyte of the present invention can be used, for example, as a solid electrolyte for all-solid-state batteries. Further, according to another embodiment of the present invention, an all-solid-state battery comprising the above-described solid electrolyte for all-solid-state batteries is provided.

In this regard, the "all-solid-state battery" is an all-solid-state lithium ion secondary battery. FIG. 2 is a schematic cross sectional view of an all-solid-state battery according to one embodiment of the present invention. An all-solid-state battery 10 has a structure in which a solid electrolyte layer 2 is arranged between a positive electrode layer 1 and a negative electrode layer 3. The all-solid-state battery 10 can be used in various devices including mobile phones, personal computers and automobiles.

The LGPS-type solid electrolyte of the present invention may be contained as a solid electrolyte in at least one of the positive electrode layer 1, the negative electrode layer 3 and the solid electrolyte layer 2. In the case where the LGPS-type solid electrolyte of the present invention is contained in the positive electrode layer 1 or negative electrode layer 3, the LGPS-type solid electrolyte of the present invention is used in combination with a publicly-known positive electrode active material or negative electrode active material for lithium ion secondary batteries. The quantitative ratio of the LGPS-type solid electrolyte of the present invention to be contained in the positive electrode layer 1 or negative electrode layer 3 is not particularly limited.

In the case where the LGPS-type solid electrolyte of the present invention is contained in the solid electrolyte layer 2, the solid electrolyte layer 2 may be composed of the LGPS-type solid electrolyte of the present invention alone, and according to need, an oxide solid electrolyte (e.g., $Li_7La_3Zr_2O_{12}$), a sulfide-based solid electrolyte (e.g., $Li_2S$—$P_2S_5$), other complex hydride solid electrolytes (e.g., $LiBH_4$ and $3LiBH_4$—$Li_1$), etc. may be suitably used in combination.

The all-solid-state battery is prepared by forming and laminating the above-described layers, and the forming method and laminating method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and lamination are performed by using a vacuum deposition method, ion plating method, sputtering method, laser ablation method or the like; and a pressing method in which powder is formed by hot pressing or cold pressing (not heating) and laminated.

Since the LGPS-type solid electrolyte of the present invention is relatively soft, it is particularly preferred to prepare the all-solid-state battery by forming the respective layers by means of the pressing method and laminating the layers. As the pressing method, there are hot pressing in which heating is performed and cold pressing in which heating is not performed, but forming the layers can be sufficiently carried out even by means of cold pressing.

Note that the present invention includes a formed body obtained by heating and forming the LGPS-type solid electrolyte of the present invention. The formed body is suitably used as the all-solid-state battery. Further, the present invention includes a method for producing an all-solid-state battery, which includes a step of heating and forming the LGPS-type solid electrolyte of the present invention.

EXAMPLES

Hereinafter, the embodiments of the present invention will be more specifically described by way of examples, but the embodiments are not limited to the examples.

Example 1

<Solution-Making Step>

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S$:$P_2S_5$ became 1.35:1. Next, to tetrahydrofuran (manufactured by Wako Pure Chemical Industries, Ltd., super dehydrated grade), $Li_2S$ and $P_2S_5$ were added in this order so that the concentration of ($Li_2S$+$P_2S_5$) became 10 wt %, and mixing was carried out at room temperature for 12 hours. The mixture was gradually dissolved, and a homogeneous solution was obtained.

<Precipitation Step>

To the obtained homogeneous solution, $GeS_2$ (GE104PB manufactured by Kojundo Chemical Laboratory Co., Ltd.) in an amount of one time the molar quantity of $P_2S_5$ in the homogeneous solution was added while stirring, subsequently $Li_2S$ in an amount of 3.65 times the molar quantity of $P_2S_5$ in the homogeneous solution was added while stirring (that is, based on the total amount, $Li_2S$:$P_2S_5$:$GeS_2$=5:1:1), and mixing was carried out at room temperature for 12 hours to generate a precipitate. This was filtered to obtain a filter cake, and it was washed, wherein 300 parts by weight of tetrahydrofuran was used relative to 100 parts by weight of the filter cake. After that, the filter cake was thinly spread in an alumina boat.

<Drying Step>

This alumina boat was put into a stainless tube, and the temperature was increased to 250° C. over 1 hour while flowing argon (G3 grade) at a linear velocity of 8.8 cm/min. After that, the temperature was kept at 250° C. for 3 hours to perform drying, thereby obtaining a precursor. The operations in the precipitation step and the drying step were carried out in the glovebox under argon atmosphere.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 550° C. over 3 hours, and then burning was carried out at 550° C. for 8 hours, thereby synthesizing $Li_{10}GeP_2S_{12}$ crystal.

Example 2

$Li_{10}SnP_2S_{12}$ crystal was synthesized in a manner similar to that in Example 1 except that $SnS_2$ (manufactured by Mitsuwa Chemicals Co., Ltd.) was used instead of $GeS_2$.

Example 3

<Microminiaturization of $SiS_2$>

In a glovebox under argon atmosphere, $SiS_2$ (manufactured by Mitsuwa Chemicals Co., Ltd.) was weighed and put into a 45-mL zirconia pot, zirconia balls ("YTZ" manufactured by Nikkato Corporation, φ:10 mm, number:18) were further put therein, and the pot was completely sealed. The pot was attached to a planetary ball mill ("P-7" manufactured by Fritsch) and mechanical milling was carried out at a rotation speed of 370 rpm for 2 hours to obtain microminiaturized $SiS_2$. The particle diameter thereof was measured by means of SEM and it was in the range of from 100 nm to 5 μm.

<Solution-Making Step>

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S$:$P_2S_5$ became 1:1. Next, to acetonitrile (manufactured by Wako Pure Chemical Industries, Ltd., super dehydrated grade), $Li_2S$ and $P_2S_5$ were added in this order so that the concentration of ($Li_2S$+$P_2S_5$) became 10 wt %, and mixing was carried out at room temperature for 3 hours. The mixture was gradually dissolved, and a homogeneous solution was obtained.

<Precipitation Step>

To the obtained homogeneous solution, $SiS_2$ (manufactured by Mitsuwa Chemicals Co., Ltd.) obtained above in an amount of 2.42 times the molar quantity of $P_2S_5$ in the homogeneous solution and LiCl (manufactured by Sigma-Aldrich, purity: 99.99%) in an amount of 0.42 time the molar quantity of $P_2S_5$ in the homogeneous solution were added while stirring, and mixing was carried out at room temperature for 12 hours. Further, $Li_2S$ in an amount of 5.42 times the molar quantity of $P_2S_5$ in the homogeneous solution was added thereto while stirring (that is, based on the total amount, the molar ratio of $Li_2S:P_2S_5:SiS_2:LiCl=6.42:1:2.42:0.42$), and mixing was carried out at room temperature for 24 hours to obtain a slurry solution.

<Drying Step>

The obtained slurry solution was dried under vacuum at 200° C. for 2 hours to remove the solvent. At the time of removing the solvent, the solution was stirred. After that, it was cooled to room temperature to obtain a precursor.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 475° C. over 3 hours, and then burning was carried out at 475° C. for 8 hours, thereby synthesizing $Li_{9.54}Si_{1.74}P_{1.44}S_{11.7}Cl_{0.3}$ crystal.

Comparative Example 1

<Method for Producing $\beta$-$Li_3PS_4$>

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S:P_2S_5$ became 1.35:1. Next, to tetrahydrofuran (manufactured by Wako Pure Chemical Industries, Ltd., super dehydrated grade), $Li_2S$ and $P_2S_5$ were added in this order so that the concentration of ($Li_2S+P_2S_5$) became 10 wt %, and mixing was carried out at room temperature for 12 hours. The mixture was gradually dissolved, and a homogeneous solution was obtained.

To the obtained solution, $Li_2S$ was further added so that the composition of all the raw materials including the above-described ones became such that the molar ratio of $Li_2S:P_2S_5=3:1$, and mixing was carried out at room temperature for 12 hours to obtain a precipitate. This was filtered to obtain a filter cake, and it was vacuum dried at 150° C. for 4 hours, thereby obtaining $\beta$-$Li_3PS_4$. The series of operations was carried out in the glovebox under argon atmosphere.

The obtained $\beta$-$Li_3PS_4$ was subjected to Raman spectroscopy described later, and a peak at 420 $cm^{-1}$ corresponding to $PS_4^{3-}$ was confirmed.

<Synthesis of LGPS>

In the glovebox under argon atmosphere, weighing was carried out so that the molar ratio of $\beta$-$Li_3PS_4$ obtained above:$Li_2S$:$GeS_2$ became 2:2:1, and the materials were mixed using an agate mortar. This was put into a glass reaction tube, which was placed in an electric tube furnace. The portion of the reaction tube where the sample was positioned was heated in the center of the electric tube furnace, and the other end of the reaction tube to which an argon injection line was connected was projected from the electric tube furnace and in a condition at near room temperature. Burning was carried out under argon atmosphere at 550° C. for 8 hours, thereby obtaining $Li_{10}GeP_2S_{12}$ crystal. The amount of a volatile matter that adhered to the portion of the reaction tube projected from the electric tube furnace was very small.

Comparative Example 2

$Li_{10}SnP_2S_{12}$ crystal was synthesized in a manner similar to that in Comparative Example 1, except that $SnS_2$ was used instead of $GeS_2$.

<X-Ray Diffraction Measurement>

Powders of the ion conductors obtained in Examples 1-3 and Comparative Examples 1-2 were subjected to the X-ray diffraction measurement under Ar atmosphere at room temperature (25° C.) ("X' Pert3 Powder" manufactured by PANalytical, CuKα: λ=1.5405 Å).

The results of the X-ray diffraction measurement of the ion conductors obtained in Examples 1-3 and Comparative Examples 1-2 are shown in FIG. 3.

As shown in FIG. 3, in Examples 1-3, the diffraction peaks were observed at at least 2θ=20.18°±0.50°, 20.44°±0.50°, 26.96°±0.50° and 29.58°±0.50°, and the pattern corresponded to that of $Li_{10}GeP_2S_{12}$ of ICSD database.

When the diffraction intensity of the peak at 2θ=29.58°±0.50° is referred to as $I_A$ and the diffraction intensity of the peak at 2θ=27.33°±0.50° is referred to as $I_B$, $I_B$ was very small and in all of Examples 1-3, $I_B/I_A$ was 0.1 or less.

<Lithium Ion Conductivity Measurement>

Each of the ion conductors obtained in Examples 1-2 and Comparative Examples 1-2 was subjected to uniaxial molding (240 MPa) to obtain a disk having a thickness of about 1 mm and a diameter of 8 mm. The AC impedance was measured by the four-terminal method utilizing a lithium electrode at room temperature (25° C.) and at 10° C. intervals in temperature ranges of from 30° C. to 100° C. and to −20° C. ("S11260 IMPEDANCE/GAIN-PHASE ANALYZER" manufactured by Solartron), and the lithium ion conductivity was calculated.

Specifically, the sample was put into a thermostatic bath with its temperature being set at 25° C. and it was kept for 30 minutes, and after that, the lithium ion conductivity was measured. Subsequently, the temperature of the thermostatic bath was increased at 10° C. intervals from 30° C. to 100° C., and at each temperature, it was kept for 25 minutes and then the ion conductivity was measured. After the measurement at 100° C. was finished, the temperature of the thermostatic bath was decreased at 10° C. intervals from 90° C. to 30° C., and at each temperature, it was kept for 40 minutes and then the lithium ion conductivity was measured. Next, the lithium ion conductivity of the sample after being kept in the thermostatic bath whose temperature was set at 25° C. for 40 minutes was measured. After that, the temperature of the thermostatic bath was decreased at 10° C. intervals from 20° C. to −20° C., and at each temperature, it was kept for 40 minutes and then the lithium ion conductivity was measured. The measurement frequency range was 0.1 Hz to 1 MHz, and the amplitude was 50 mV. The measurement results of the lithium ion conductivity at the time of decreasing the temperature are shown in FIG. 4.

The ion conductor obtained in Example 3 was subjected to uniaxial molding (420 MPa) to obtain a disk having a thickness of about 1 mm and a diameter of 10 mm. Using a cell for evaluating all-solid-state batteries (manufactured by Hohsen Corporation), the AC impedance was measured by the four-terminal method utilizing an indium electrode at room temperature (25° C.) ("S11260 IMPEDANCE/GAIN- PHASE ANALYZER" manufactured by Solartron), and the lithium ion conductivity was calculated.

Specifically, the sample was put into a thermostatic bath with its temperature being set at 25° C. and it was kept for 30 minutes, and after that, the lithium ion conductivity was measured. The measurement frequency range was 0.1 Hz to 1 MHz, and the amplitude was 50 mV. The lithium ion conductivity was 8.2 mS/cm.

<Raman Spectroscopy>

(1) Preparation of Sample

A sample to be measured was prepared by using an airtight container having quartz glass (Φ: 60 mm, thickness: 1 mm) at the upper portion as an optical window. In a glovebox under argon atmosphere, a liquid was retained in the sample in a state where the sample was in contact with the quartz glass, then the container was sealed and taken out from the glovebox, and Raman spectroscopy was carried out.

(2) Measurement Conditions

Using Laser Raman Spectrometer NRS-5100 (manufactured by JASCO Corporation), the measurement was carried out at an excitation wavelength of 532.15 nm for an exposure time of 5 seconds.

The results of Raman spectroscopy of the homogeneous solution obtained in <Solution-making step> in Example 1 are shown in FIG. 5. In Raman spectroscopy, peaks were obtained at at least $313\pm10$ cm$^{-1}$, $391\pm10$ cm$^{-1}$, $483\pm10$ cm$^{-1}$ and $589\pm10$ cm$^{-1}$. Note that also in the case of using acetonitrile or ethyl acetate instead of tetrahydrofuran, peaks similar to those of the homogeneous solution obtained using tetrahydrofuran were obtained.

Peaks corresponding to a P—S bond are mainly detected at 300 to 600 cm$^{-1}$. Though peaks of a solvent also exist, peaks in the Raman spectroscopy qualitatively show a bonding state of $Li_2S$—$P_2S_5$ in the solvent.

EXPLANATIONS OF LETTERS OR NUMERALS

1 positive electrode layer
2 solid electrolyte layer
3 negative electrode layer
10 all-solid-state battery

The invention claimed is:

1. A method for producing an LGPS-type solid electrolyte, which comprises:
   preparing a homogeneous solution by mixing and reacting $Li_2S$ and $P_2S_5$ in an organic solvent such that a molar ratio of $Li_2S/P_2S_5$ is 1.0 to 1.85;
   forming a precipitate by adding, to the homogeneous solution, at least one $MS_2$ (M is selected from the group consisting of Ge, Si and Sn) and additional $Li_2S$ and then mixing to generate the precipitate;
   obtaining a precursor by removing the organic solvent from the precipitate; and
   obtaining the LGPS-type solid electrolyte by heating the precursor at 200 to 700° C.

2. The method according to claim 1, wherein the organic solvent is at least one selected from the group consisting of tetrahydrofuran, acetonitrile, ethyl acetate and methyl acetate.

3. The method according to claim 1, wherein a temperature in the removing of the organic solvent from the precipitate for obtaining the precursor is 60 to 280° C.

4. The method according to claim 1, wherein the LGPS-type solid electrolyte has peaks at least $2\theta=20.18°\pm0.50°$, $20.44°\pm0.50°$, $26.96°\pm0.50°$ and $29.58°\pm0.50°$ in X-ray diffraction (CuKα: λ=1.5405 Å).

5. The method according to claim 4, wherein when a diffraction intensity of the peak at $2\theta=29.58°\pm0.50°$ is referred to as $I_A$ and the diffraction intensity of the peak at $2\theta=27.33°\pm0.50°$ is referred to as $I_B$, $I_B/I_A$ is less than 0.50.

6. The method according to claim 1, wherein the LGPS-type solid electrolyte has an octahedron O composed of an Li element and an S element, a tetrahedron $T_1$ composed of at least one element selected from the group consisting of P, Ge, Si and Sn and an S element, and a tetrahedron $T_2$ composed of a P element and an S element, and mainly includes a crystal structure in which the tetrahedron $T_1$ and the octahedron O share an edge and the tetrahedron $T_2$ and the octahedron O share a vertex.

7. The method according to claim 1, wherein the heating of the precursor for obtaining the LGPS-type solid electrolyte is carried out under inert gas atmosphere.

\* \* \* \* \*